R. OTERS.
PLANT PROTECTOR.
APPLICATION FILED JUNE 28, 1913.
1,098,586.
Patented June 2, 1914.
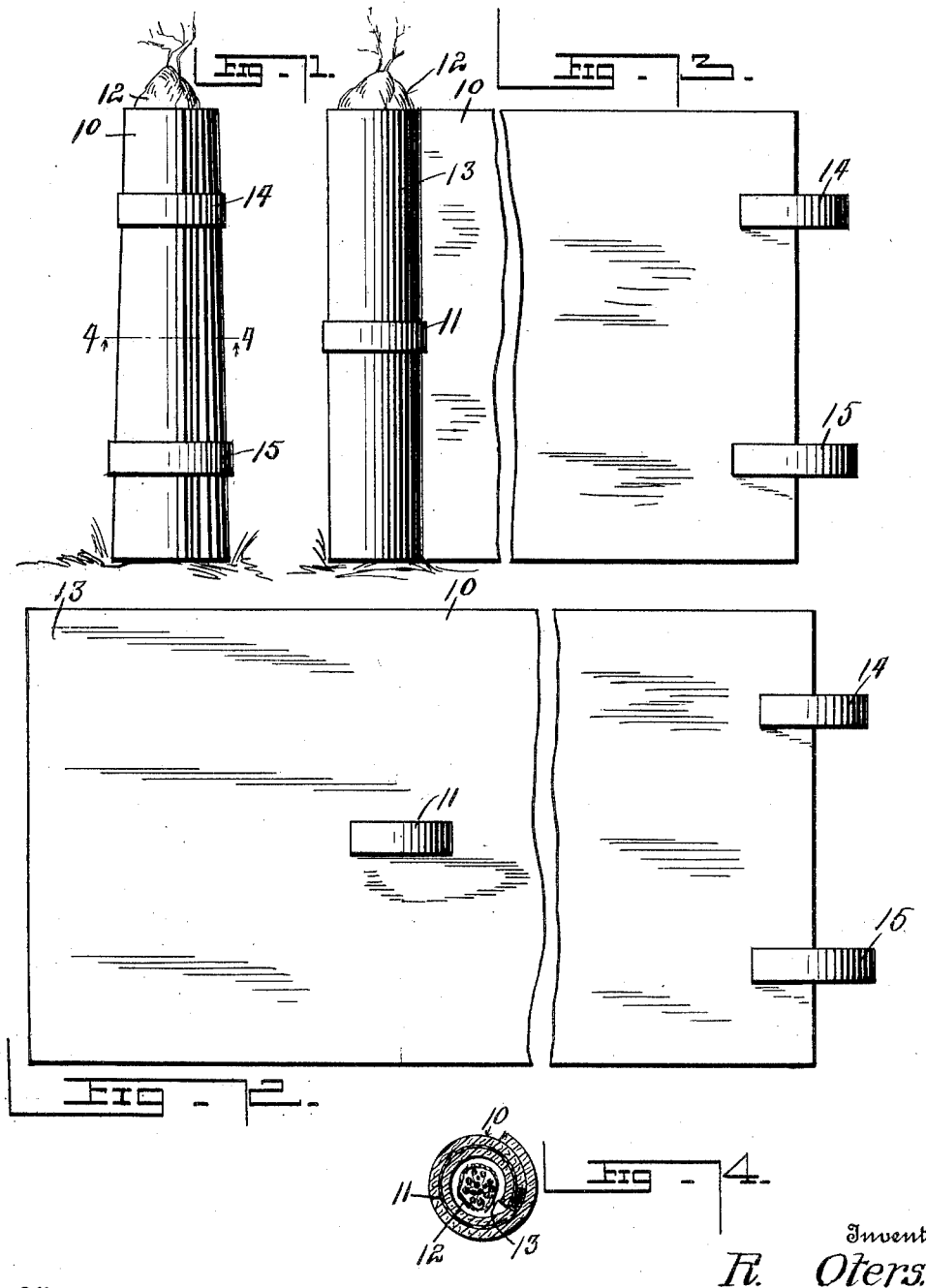
Witnesses
Roland T. Williams.
Harry M. Test.
Inventor
R. Oters.
By Chandlee & Chandlee
Attorneys

UNITED STATES PATENT OFFICE.

RICHARD OTERS, OF OSSINING, NEW YORK.

PLANT-PROTECTOR.

1,098,586.      Specification of Letters Patent.      Patented June 2, 1914.

Application filed June 28, 1913. Serial No. 776,290.

*To all whom it may concern:*

Be it known that I, RICHARD OTERS, a citizen of the United States, residing at Ossining, in the county of Westchester, State of New York, have invented certain new and useful Improvements in Plant-Protectors; and I do hereby declare the following to be a full, clear, and exact description of the invention, such as will enable others skilled in the art to which it appertains to make and use the same.

This invention relates to improvements in plant protectors and particularly to protectors for rose bushes.

The principal object of the invention is to provide a simple device of this character which can be quickly and easily wrapped around a rose bush and be held positively from displacement, so that the bush will be thoroughly protected from frost.

Other objects and advantages reside in the peculiar construction and arrangement of the various parts to accomplish the above result.

In the drawings: Figure 1 is a perspective view showing my device engaged around a plant. Fig. 2 is a view of the plant protector in flat condition showing the arrangement of the clamping devices. Fig. 3 is an elevation showing the first step in wrapping the protector around a plant, and Fig. 4 is a horizontal transverse section on the line 4—4 of Fig. 1.

Referring particularly to the accompanying drawings, the protector includes an elongated strip of suitable flexible material 10 of matting, cork, or some stiff material of like character which forms the body portion of the protector. Pivotally mounted on the body portion of approximately one-fourth the distance from one end thereof is the curved spring clip 11, this clip being arranged on the inside of the body member and adapted to be engaged around the plant 12 and the adjacent portion 13 of the body member. Thus the said portion 13 is rolled around the plant and this portion and the plant held together. At the opposite end of the body member are the similarly mounted and formed spring clips 14 and 15, the former of which is slightly smaller than the latter so that when the remainder of the body portion is wrapped around the plant, the protector will assume the shape of a truncated cone. By forming the clip 14 of lesser size than the clip 15, provides for retaining the upper end of the protector smaller in diameter than the lower portion.

The spring clips 11, 14 and 15 are preferably in the form of flexible flat springs which are normally in a circular shape, the springs being of such resiliency and strength as to closely embrace the rolled body portion 10 when the same is engaged around a plant and securely hold the same in such position.

I claim:—

A plant protector comprising a strip of flexible material for engagement around a plant, a spring clip carried by the strip a suitable distance from one end thereof and arranged to embrace the adjacent end portion of the strip and a plant, and a plurality of similar clips mounted on the other end of the strip and arranged for embracing engagement around the strip when rolled.

In testimony whereof, I affix my signature, in the presence of two witnesses.

RICHARD OTERS.

Witnesses:
    FRANK G. WOOD,
    ROBERT LEWIS.